United States Patent
Wang et al.

(10) Patent No.: US 12,473,300 B2
(45) Date of Patent: Nov. 18, 2025

(54) THIENOPYRIMIDINE DERIVATIVE AND PREPARATION METHOD THEREFOR

(71) Applicant: GUANGZHOU MAXINOVEL PHARMACEUTICALS CO., LTD., Guangdong (CN)

(72) Inventors: Yuguang Wang, Guangdong (CN); Tianzhi Wu, Guangdong (CN); Nong Zhang, Guangdong (CN)

(73) Assignee: GUANGZHOU MAXINOVEL PHARMACEUTICALS CO., LTD., Guangdong (CN)

( * ) Notice: Subject to any disclaimer, the term of this patent is extended or adjusted under 35 U.S.C. 154(b) by 642 days.

(21) Appl. No.: 17/909,753

(22) PCT Filed: Feb. 26, 2021

(86) PCT No.: PCT/CN2021/078037
§ 371 (c)(1),
(2) Date: Sep. 6, 2022

(87) PCT Pub. No.: WO2021/175155
PCT Pub. Date: Sep. 10, 2021

(65) Prior Publication Data
US 2023/0144170 A1 May 11, 2023

(30) Foreign Application Priority Data
Mar. 6, 2020 (CN) .......................... 202010152775.6

(51) Int. Cl.
*C07D 495/04* (2006.01)
*B01J 21/18* (2006.01)
(Continued)

(52) U.S. Cl.
CPC ............ *C07D 495/04* (2013.01); *B01J 21/18* (2013.01); *B01J 23/42* (2013.01); *B01J 31/2404* (2013.01);
(Continued)

(58) Field of Classification Search
CPC ... C07D 495/04; C07D 211/46; C07D 401/04
See application file for complete search history.

(56) References Cited

U.S. PATENT DOCUMENTS

| 6,399,603 B1 | 6/2002 | Jacobs et al. |
| 2017/0196854 A1 | 7/2017 | Chassaing et al. |
| 2018/0208604 A1* | 7/2018 | Xu ...................... A61K 31/519 |

FOREIGN PATENT DOCUMENTS

| CN | 102924473 A | 2/2013 |
| CN | 106366093 A | 2/2017 |

(Continued)

OTHER PUBLICATIONS

First Office Action dated Jul. 19, 2023 issued in Chinese Patent Application No. 2021102195767.
(Continued)

*Primary Examiner* — Sikarl A Witherspoon
(74) *Attorney, Agent, or Firm* — Nath, Goldberg & Meyer; Joshua B. Goldberg

(57) ABSTRACT

Disclosed are a thienopyrimidine derivative and a preparation method therefor. Provided is a method for preparing a compound as shown in formula B, which method is characterized by comprising the following steps: subjecting a compound as shown in formula C with a compound as shown in formula K to a coupling reaction as shown below under a protective gas atmosphere, in a solvent and in the presence of a catalyst and a base, wherein the catalyst comprises a palladium compound and a phosphine ligand. The preparation method of the present invention can improve the yield of products, and reduce the production cost; in addition, the preparation method has simple reaction conditions and a strong process operability, which is beneficial to industrial production and the reduction of the generation of three wastes.

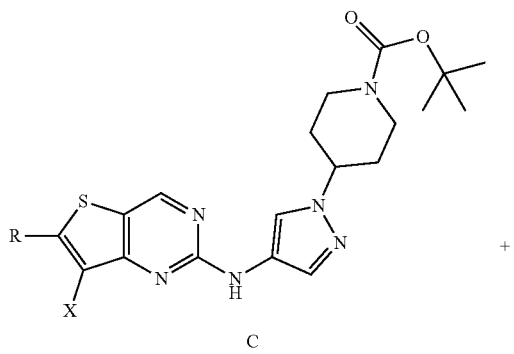

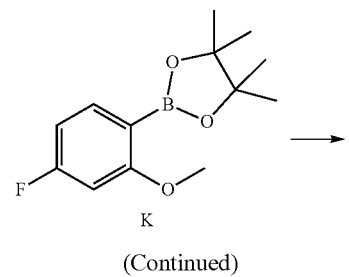

(Continued)

-continued

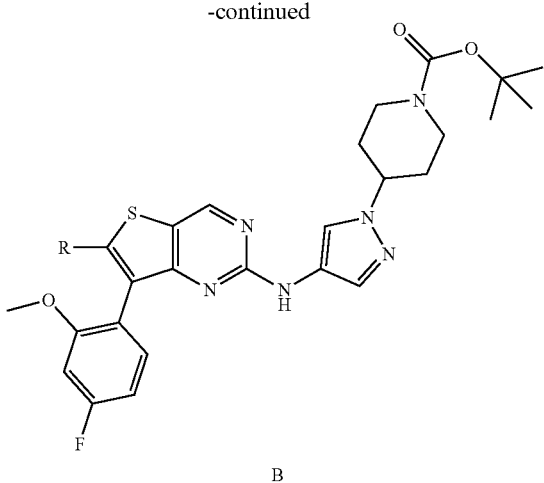

B

16 Claims, No Drawings

(51) Int. Cl.
 B01J 23/42 (2006.01)
 B01J 31/24 (2006.01)
 B01J 31/28 (2006.01)
 C07D 211/46 (2006.01)
 C07D 401/04 (2006.01)
(52) U.S. Cl.
 CPC ............. B01J 31/28 (2013.01); C07D 211/46 (2013.01); C07D 401/04 (2013.01)

(56) References Cited

FOREIGN PATENT DOCUMENTS

| | | |
|---|---|---|
| CN | 106470683 A | 3/2017 |
| CN | 107602583 A | 1/2018 |
| WO | 2015/027222 A2 | 2/2015 |
| WO | 2016/169504 A1 | 10/2016 |
| WO | 2017/012559 A1 | 1/2017 |
| WO | 2019/228171 A1 | 12/2019 |

OTHER PUBLICATIONS

Search Report dated Jul. 19, 2023 issued in Chinese Patent Application No. 2021102195767.
Yun Chen et al., Design and synthesis of Imidazo[1,2-b]pyridazine IRAK4 inhibitors for the treatment of mutant MYD88 L265P diffuse large B-cell lymphoma, Eur J Med Chem 190(2020) 112092, 202001.
International Search Report dated Apr. 28, 2021 issued in corresponding International Application No. PCT/CN2021/078037.
Supplementary Partial European Search Report dated Mar. 18, 2024 issued in European Patent Application No. 21764740.3.
Park Yong Sun et al., "Lithiation-Substitutions of N-Boc N-Alkyl Cyclopropylamines", Tetrahedron, Jan. 1, 1996, pp. 12333-12350.
Yang-Ming Zhang et al., "An Efficient 1-9 Synthesis of 2-Chloropyrimidines via Pd-catalyzed Regioselective Dechlorination of 2,4-Dichloropyrimidines in the Presence of NaHCO3", Chinese Journal of Chemistry, Zhongguo Kexueyuan, CN, vol. 26, May 15, 2008, pp. 962-964.
Extended European Search Report dated Jun. 17, 2024 issued in European Patent Application No. 21764740.3.
Office Action dated Aug. 30, 2024 issued in Taiwanese Application No. 110107898.

\* cited by examiner

THIENOPYRIMIDINE DERIVATIVE AND PREPARATION METHOD THEREFOR

This is a National Phase Application filed under 35 U.S.C. 371 as a national stage of PCT/CN2021/078037, filed Feb. 26, 2021, an application claiming the benefit of Chinese Application No. 202010152775.6, filed Mar. 6, 2020, the content of each of which is hereby incorporated by reference in its entirety.

TECHNICAL FIELD

The present disclosure relates to a thienopyrimidine derivative and a preparation method therefor.

BACKGROUND 7-(4-Fluoro-2-methoxyphenyl)-6-methyl-N-(1-piperidin-4-yl)-1H-pyrazol-4-yl)thieno[3,2-d]pyrimidin-2-amine is a strong inhibitor of JAK, FGFR, FLT3 kinase, and has good application prospects in the treatment of tumors, immune system diseases, allergic diseases and cardiovascular diseases. This compound is described in patent CN106366093 A and has the following chemical structure:

CN106366093 A discloses a preparation method of this compound:

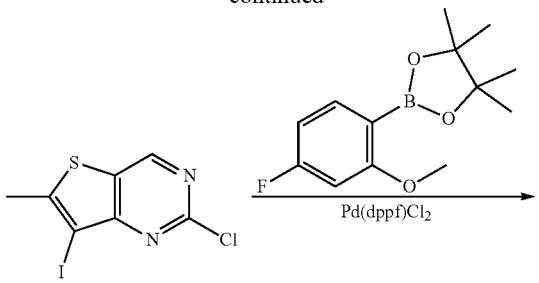

-continued

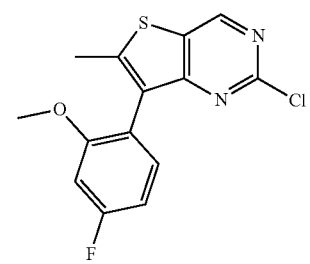

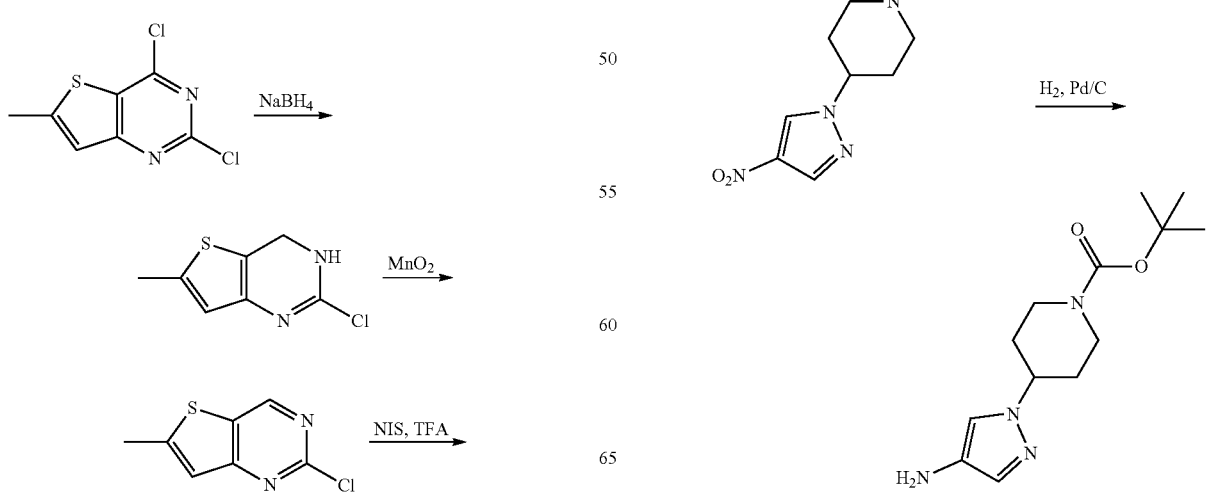

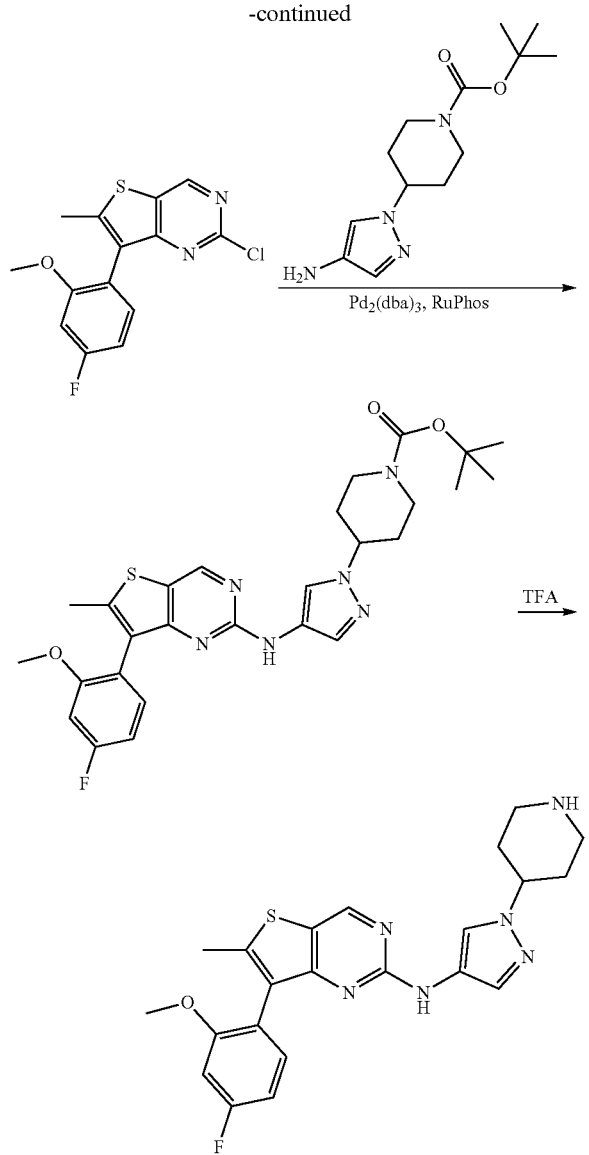

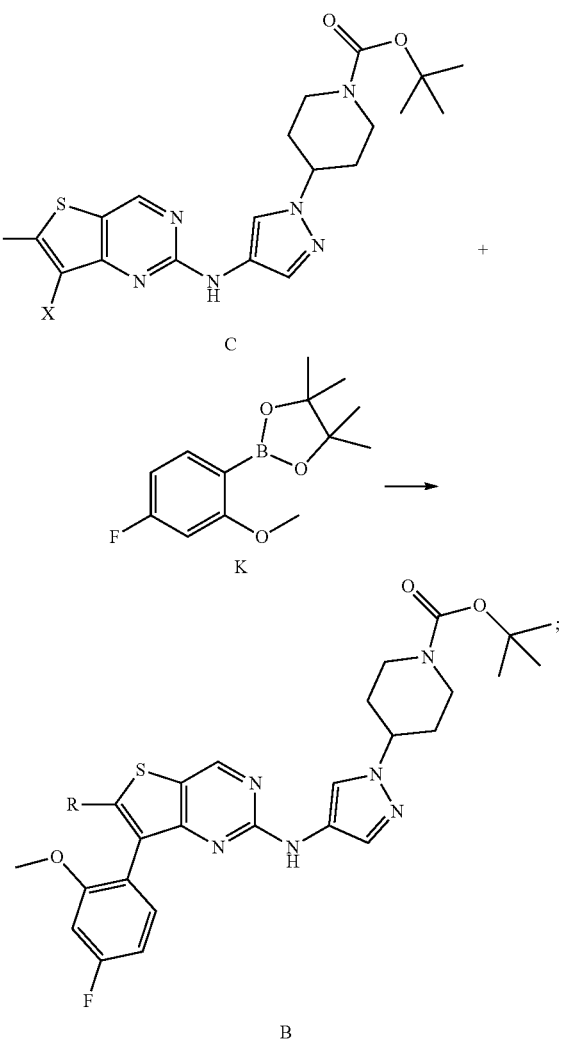

In the above synthetic route, NaBH₄ is sodium borohydride, MnO₂ is manganese dioxide, NIS is N-iodosuccinimide, TFA is trifluoroacetic acid, Pd(dppf)Cl₂ is [1,1'-bis(diphenylphosphino)ferrocene]palladium dichloride, DIAD is diisopropyl azodicarboxylate, PPh₃ is triphenylphosphine, Pd/C is palladium on carbon, Pd₂(dba)₃ is tris(dibenzylideneacetone)dipalladium, and RuPhos is 2-dicyclohexylphosphino-2',6'-diisopropoxybiphenyl.

However, the above method has problems such as many reaction steps, low yield, and requires column chromatography for separation and purification, and is not suitable for industrial scale-up production, so it is necessary to improve its preparation method.

CONTENT OF THE PRESENT INVENTION

The technical problem to be solved by the present disclosure is to overcome the defects of the existing preparation methods of thienopyrimidine derivatives, such as low yield and unsuitable for industrial production, and the present disclosure provides a thienopyrimidine derivative and a preparation method therefor. The present disclosure provides a new synthesis idea, and the preparation method of the present disclosure can improve the yield of products and reduce the production cost; in addition, the preparation method has simple reaction conditions and a strong process operability, which is beneficial to industrial production and the reduction of the generation of three wastes.

The present disclosure provides a preparation method of a compound as shown in formula B, which comprises the following steps: subjecting a compound as shown in formula C with a compound as shown in formula K to a coupling reaction as shown below under a protective gas atmosphere, in a solvent and in the presence of a catalyst and a base; the catalyst comprises a palladium compound and a phosphine ligand;

wherein, X is Br or I;
R is H or C₁-C₃ alkyl.

In the preparation method of the compound as shown in formula B, X is preferably Br.

In the preparation method of the compound as shown in formula B, R is preferably C₁-C₃ alkyl, more preferably methyl.

In the preparation method of the compound as shown in formula B, the solvent can be a conventional solvent in the art, preferably a mixed solvent of water and an organic solvent. The organic solvent is preferably an ether solvent, more preferably dioxane. The volume ratio of the water to the organic solvent can be a conventional volume ratio in the art, preferably 1:1 to 1:10, more preferably 1:2 to 1:5 (e.g., 1:3.3).

In the preparation method of the compound as shown in formula B, the base can be a conventional base in the art, preferably an inorganic base, more preferably an alkali metal carbonate (e.g., sodium carbonate and/or potassium carbonate).

In the preparation method of the compound as shown in formula B, the palladium compound can be a conventional palladium compound in the art, such as zero-valent palladium or divalent palladium salt, and the divalent palladium salt is preferably $PdCl_2$ and/or $Pd(OAc)_2$;

in the preparation method of the compound as shown in formula B, the phosphine ligand can be a conventional phosphine ligand in the art, preferably 2-dicyclohexylphosphino-2,4,6-triisopropylbiphenyl(X-Phos) and/or 1,1'-bis(diphenylphosphino)ferrocene, more preferably 2-dicyclohexylphosphino-2,4,6-triisopropylbiphenyl.

In the preparation method of the compound as shown in formula B, the palladium compound and the phosphine ligand can be in the conventional existence form in the art, for example, the palladium compound and the phosphine ligand are added in the form of a complex, or, the palladium compound and the phosphine ligand are added in the form of a mixture; the complex is, for example, a complex form of zero-valent palladium and a phosphine ligand, and/or, a complex form of a divalent palladium salt and a phosphine ligand. The complex form of the divalent palladium salt and the phosphine ligand can be $Pd(dppf)Cl_2$.

In the preparation method of the compound as shown in formula B, the molar concentration of the compound as shown in formula C in the solvent can be a conventional molar concentration in the art, preferably 0.1 to 0.5 mol/L, more preferably 0.1 to 0.3 mol/L (e.g., 0.19 mol/L).

In the preparation method of the compound as shown in formula B, the molar ratio of the compound as shown in formula K to the compound as shown in formula C can be a conventional molar ratio in the art, preferably 1:1 to 3:1, more preferably 1:1 to 2:1 (e.g., 1.3:1).

In the preparation method of the compound as shown in formula B, the molar ratio of the base to the compound as shown in formula C can be a conventional molar ratio in the art, preferably 1:1 to 3:1, more preferably 1:1 to 2:1 (e.g., 1.6:1).

In the preparation method of the compound as shown in formula B, the molar ratio of the palladium compound to the compound as shown in formula C can be a conventional molar ratio in the art, preferably 1:50 to 1:150, more preferably 1:100 to 1:120 (e.g., 1:117).

In the preparation method of the compound as shown in formula B, the molar ratio of the phosphine ligand to the palladium compound can be a conventional molar ratio in the art, preferably 1:1 to 5:1, more preferably 1:1 to 3:1 (e.g., 2.4:1).

In the preparation method of the compound as shown in formula B, the protective gas can be a conventional protective gas in the art, such as nitrogen and/or argon, preferably nitrogen.

In the preparation method of the compound as shown in formula B, the temperature of the coupling reaction can be a conventional reaction temperature in the art, preferably 50 to 100° C., more preferably 65 to 75° C. (e.g., 70° C.).

In the preparation method of the compound as shown in formula B, the progress of the coupling reaction can be monitored by conventional means in the art (e.g., TLC, LC-MS or HPLC, etc.); the time of the coupling reaction is not particularly limited, provided that the content of the compound as shown in formula C in the reaction system no longer changes, and the time of the coupling reaction is preferably 3 to 7 hours, more preferably 3 to 5 hours (e.g., 4 hours).

The post-treatment of the coupling reaction can also comprise the following steps: mixing the reaction solution with ammonia water and water, extracting with organic solvent, washing the obtained organic phase, removing the palladium from the organic phase, filtering, concentrating the filtrate, slurrying the concentrate, filtering and drying. The volume ratio of the ammonia water to the solvent is preferably 1:5 to 1:8 (e.g., 1:6.5). Before the ammonia water is mixed with the reaction solution, the temperature is preferably lowered to 30 to 50° C. (e.g., 40° C.). After the ammonia water is mixed with the reaction solution, the mixture is preferably stirred for 7 to 10 hours (e.g., 8 hours). The volume ratio of the water to the solvent is preferably 1:1 to 4:1 (e.g., 2.2:1). Before the water is added, the temperature is preferably lowered to 10 to 30° C. (e.g., 20° C.). The organic solvent for extracting is preferably a halogenated hydrocarbon solvent (e.g., dichloromethane). The washing is preferably washing with water and saturated brine in turn. The reagent used for removing the palladium in the organic phase can be a conventional reagent in the art, preferably 3-mercaptopropylethyl sulfide silica. The slurrying is preferably carried out by slurrying with an ether solvent (e.g., methyl tert-butyl ether) and an alcohol solvent (e.g., ethanol) in turn. The drying is preferably drying under vacuum.

The preparation method of the compound as shown in formula B can further comprise the following steps: subjecting a compound as shown in formula E with a compound as shown in formula D to a substitution reaction as shown below to obtain the compound as shown in formula C in an organic solvent and in the presence of a base;

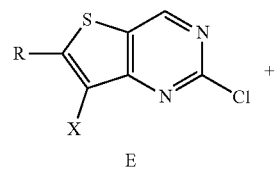

E

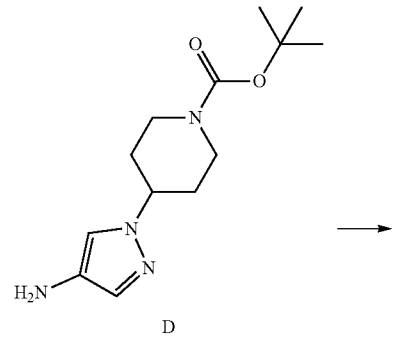

D

-continued

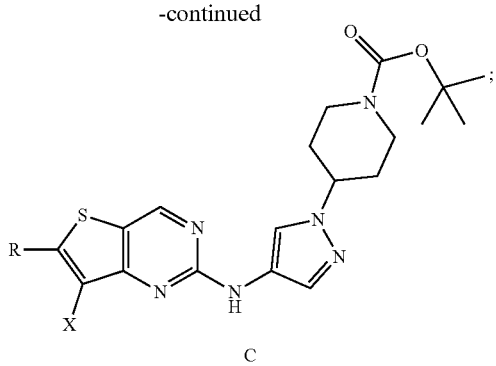

C wherein, X and R are as defined in any of the above schemes.

In the preparation method of the compound as shown in formula B, the organic solvent can be a conventional solvent in the art, preferably an alcohol solvent, more preferably n-butanol.

In the preparation method of the compound as shown in formula B, the base can be a conventional base in the art, preferably an organic base, more preferably an organic amine, further preferably N,N-diisopropylethylamine (DIPEA).

In the preparation method of the compound as shown in formula B, the molar concentration of the compound as shown in formula E in the organic solvent can be a conventional molar concentration in the art, preferably 0.3 to 1.0 mol/L, more preferably 0.5 to 0.7 mol/L (e.g., 0.65 mol/L).

In the preparation method of the compound as shown in formula B, the molar ratio of the compound as shown in formula D to the compound as shown in formula E can be a conventional molar ratio in the art, preferably 1:1 to 2:1, more preferably 1:1 to 1.5:1 (e.g., 1.3:1).

In the preparation method of the compound as shown in formula B, the temperature of the substitution reaction can be a conventional reaction temperature in the art, preferably 80° C. to the boiling point temperature of the organic solvent, more preferably 95 to 105° C. (e.g., 100° C.).

In the preparation method of the compound as shown in formula B, the progress of the substitution reaction can be monitored by conventional means in the art (e.g., TLC, LC-MS or HPLC, etc.); the time of the substitution reaction is not particularly limited, provided that the content of the compound as shown in formula E in the reaction system no longer changes, and the time of the substitution reaction is preferably 30 to 60 hours, more preferably 40 to 50 hours (e.g., 42 hours).

The post-treatment of the substitution reaction can further comprise the following steps: concentrating, slurrying the obtained concentrate, filtering and drying. The concentrating can be conventional concentrating in the art, preferably concentrating under reduced pressure. The solvent used for slurrying is preferably an alcohol solvent (e.g., methanol). The filtering can be conventional filtering in the art. The drying can be conventional drying in the art, preferably drying under vacuum.

The present disclosure provides a preparation method of the compound as shown in formula C, which comprises the following steps: subjecting the compound as shown in formula E with the compound as shown in formula D to a substitution reaction as shown below in an organic solvent and in the presence of a base;

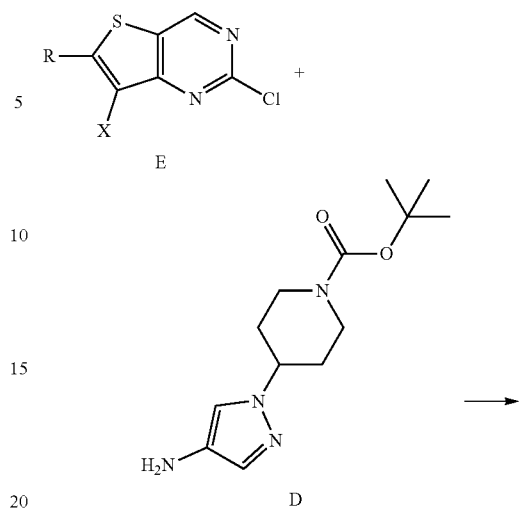

wherein, X is Br or I, preferably Br;

R is H or $C_1$-$C_3$ alkyl, preferably $C_1$-$C_3$ alkyl, more preferably methyl.

In the preparation method of the compound as shown in formula C, the conditions and operations of the substitution reaction are the same as those of such reactions mentioned above.

The present disclosure also provides a compound as shown in formula C,

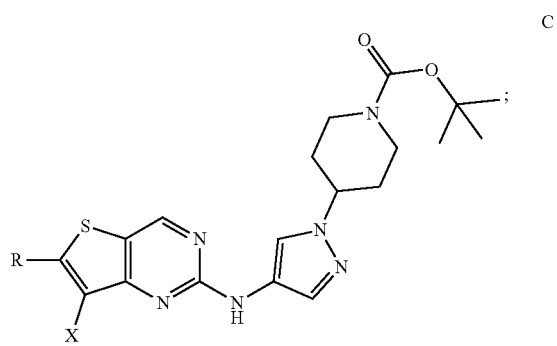

wherein, X is Br or I, preferably Br;

R is H or $C_1$-$C_3$ alkyl, preferably $C_1$-$C_3$ alkyl, more preferably methyl.

The compound as shown in formula C can be the following structure,

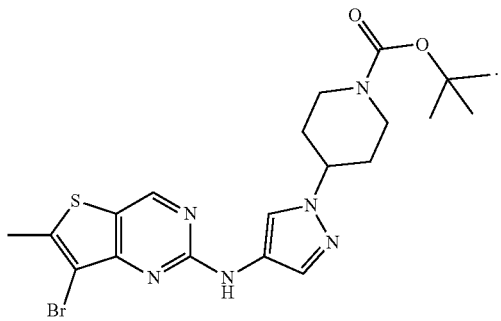 [SMILES: Cc1sc2cnc(Nc3cnn(C4CCN(C(=O)OC(C)(C)C)CC4)c3)nc2c1Br]

The present disclosure also provides a preparation method of a compound as shown in formula I, which comprises the following steps: subjecting a compound as shown in formula J with hydrogen to a reduction reaction as shown below in an organic solvent and in the presence of a base and a catalyst; the organic solvent is an ether solvent;

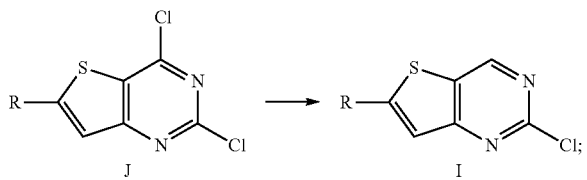

wherein, R is H or $C_1$-$C_3$ alkyl, preferably $C_1$-$C_3$ alkyl, more preferably methyl.

In the preparation method of the compound as shown in formula I, the ether solvent is preferably tetrahydrofuran (THF).

In the preparation method of the compound as shown in formula I, the base can be a conventional base in the art, preferably an organic base, more preferably an organic amine, further preferably N,N-diisopropylethylamine.

In the preparation method of the compound as shown in formula I, the catalyst can be a conventional catalyst in the art, preferably a palladium compound, more preferably palladium on carbon (e.g., palladium on carbon with a mass fraction of 10%).

In the preparation method of the compound as shown in formula I, the pressure of the hydrogen can be a conventional pressure in the art, preferably 0.3 to 0.8 MPa, more preferably 0.4 to 0.6 MPa (e.g., 0.5 MPa).

In the preparation method of the compound as shown in formula I, the molar ratio of the base to the compound as shown in formula J is preferably 1:1 to 2:1, more preferably 1:1 to 1.5:1 (e.g., 1.2:1).

In the preparation method of the compound as shown in formula I, the mass molar ratio of the catalyst to the compound as shown in formula J can be a conventional mass molar ratio in the art, preferably 10 to 50 g/mol, more preferably 40 to 50 g/mol (e.g., 42 g/mol).

In the preparation method of the compound as shown in formula I, the molar concentration of the compound as shown in formula J in the organic solvent can be a conventional molar concentration in the art, preferably 0.2 to 1.0 mol/L, more preferably 0.5 to 0.7 mol/L (e.g., 0.65 mol/L).

In the preparation method of the compound as shown in formula I, the temperature of the reduction reaction can be a conventional reaction temperature in the art, preferably 10 to 40° C., more preferably 20 to 30° C. (e.g., 25° C.).

In the preparation method of the compound as shown in formula I, the progress of the reduction reaction can be monitored by conventional means in the art (e.g., TLC, LC-MS or HPLC, etc.); the time of the reduction reaction is not particularly limited, provided that the content of the compound as shown in formula J in the reaction system no longer changes, and the time of the reduction reaction is preferably 90 to 150 hours, more preferably 110 to 130 hours (e.g., 120 hours).

The post-treatment of the reduction reaction can further comprise the following steps: filtering, concentrating the filtrate to obtain a concentrate, dissolving the concentrate with a solvent, adding water, precipitating a solid, separating the solid and drying. The conditions and operations of filtering can be conventional conditions and operations in the art. The conditions and operations of concentrating can be conventional conditions and operations in the art, preferably concentrating under reduced pressure. Before dissolving the concentrate with the solvent, it is preferable to add a solvent and then further concentrate, and the solvent is preferably an alcohol solvent (e.g., ethanol). The solvent used for dissolving the concentrate is preferably an alcohol solvent (e.g., ethanol). The temperature for dissolving the concentrate is preferably 65 to 75° C. (e.g., 70° C.). The method of adding water is preferably adding dropwise. When the water is added, the temperature is preferably 20 to 30° C. (e.g., 25° C.). The method for separating the solid can be a conventional method in the art, preferably centrifugation. The conditions and methods for drying can be conventional conditions and methods in the art, preferably drying under vacuum.

The present disclosure also provides a preparation method of the compound as shown in formula E, which comprises the following steps:
(1) preparing the compound as shown in formula I according to any of the above preparation methods;
(2) subjecting the compound as shown in formula I with a halogenated reagent to a substitution reaction as shown below in the presence of an acid;

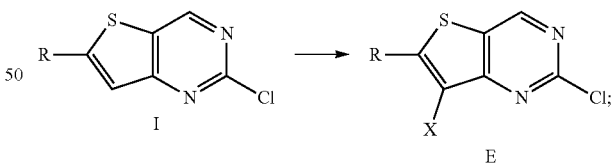

wherein, X is Br or I, preferably Br;
R is H or $C_1$-$C_3$ alkyl, preferably $C_1$-$C_3$ alkyl, more preferably methyl.

In the preparation method of the compound as shown in formula E, in step (2), the conditions and operations of the substitution reaction are the same as those conventional in the art for such reactions.

The present disclosure also provides a preparation method of the compound as shown in formula C, which comprises the following steps:
(1) preparing the compound as shown in formula E according to any of the above preparation methods;

(2) subjecting the compound as shown in formula E with the compound as shown in formula D to a substitution reaction as shown below in an organic solvent and in the presence of a base;

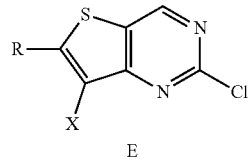

E

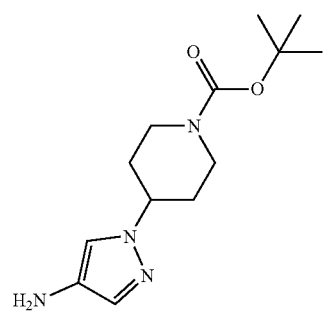

D

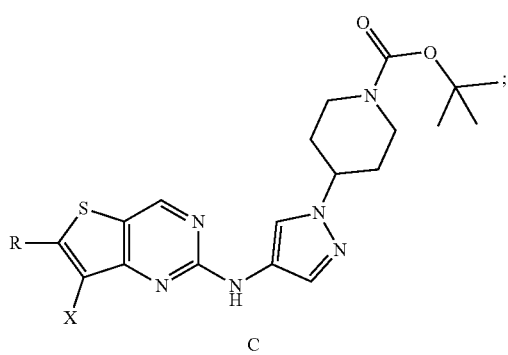

C wherein, X is Br or I, preferably Br;

R is H or $C_1$-$C_3$ alkyl, preferably $C_1$-$C_3$ alkyl, more preferably methyl.

In the preparation method of the compound as shown in formula C, in step (2), the conditions and operations of the substitution reaction are the same as those conventional in the art for such reactions.

The present disclosure provides a preparation method of a compound as shown in formula F, which comprises the following steps: subjecting a compound as shown in formula G with a compound as shown in formula L to a reaction as shown below in an organic solvent and in the presence of a base;

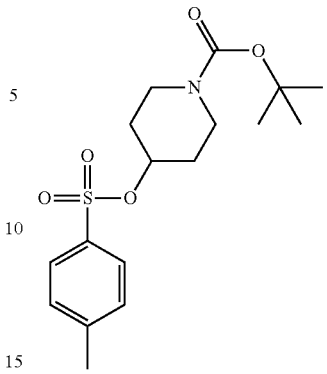

G

L → F

In the preparation method of the compound as shown in formula F, the organic solvent can be a conventional organic solvent in the art, preferably an amide solvent (e.g., N,N-dimethylformamide).

In the preparation method of the compound as shown in formula F, the base can be a conventional base in the art, preferably an inorganic base, more preferably an alkali metal carbonate (e.g., potassium carbonate).

In the preparation method of the compound as shown in formula F, the molar ratio of the compound as shown in formula L to the compound as shown in formula G can be a conventional molar ratio in the art, preferably 1:1 to 4:1, more preferably 1:1 to 2:1 (e.g., 1.1:1).

In the preparation method of the compound as shown in formula F, the molar ratio of the base to the compound as shown in formula G can be a conventional molar ratio in the art, preferably 1:1 to 5:1, more preferably 1:1 to 2:1 (e.g., 1.5:1).

In the preparation method of the compound as shown in formula F, the molar concentration of the compound as shown in formula G in the solvent can be a conventional molar concentration in the art, preferably 0.3 to 0.9 mol/L, more preferably 0.5 to 0.7 mol/L (e.g., 0.6 mol/L).

In the preparation method of the compound as shown in formula F, the temperature of the reaction can be a conventional reaction temperature in the art, preferably 50 to 100° C., more preferably 75 to 85° C. (e.g., 80° C.).

In the preparation method of the compound as shown in formula F, the progress of the reaction can be monitored by conventional means in the art (e.g., TLC, LC-MS or HPLC, etc.); the time of the reaction is not particularly limited, provided that the content of the compound as shown in formula G in the reaction system no longer changes, and the time of the reaction is preferably 10 to 30 hours, more preferably 16 to 20 hours (e.g., 18 hours).

The post-treatment of the reaction can further comprise the following steps: mixing the reaction solution with water, filtering, washing the solid and drying. The water is preferably added dropwise. The temperature during the mixing is preferably 10 to 40° C. (10 to 20° C.). After the mixing, preferably stirring for 1 to 5 hours. The solvent for the washing is preferably water. The drying is preferably drying under vacuum.

The preparation method of the compound as shown in formula F can further comprise the following steps: subjecting a compound as shown in formula H with p-toluenesulfonyl chloride to a substitution reaction as shown below to obtain the compound as shown in formula G in the presence of pyridine;

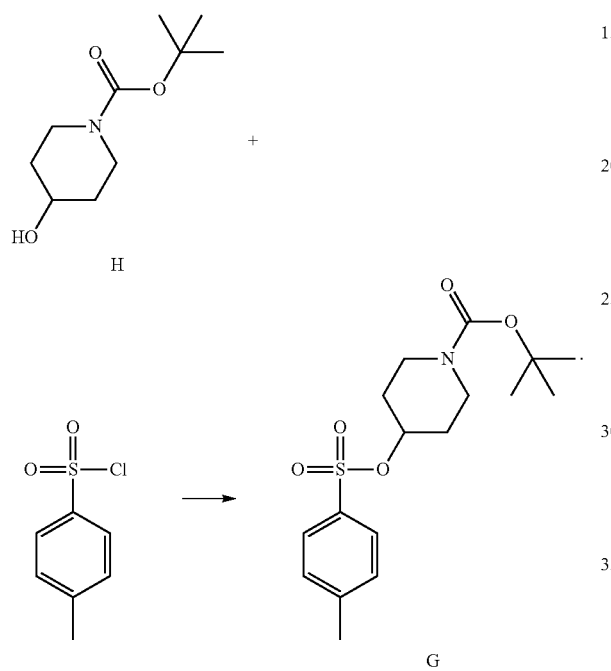

Where, the molar ratio of the p-toluenesulfonyl chloride to the compound as shown in formula H can be a conventional molar ratio in the art, preferably 1:1 to 4:1, more preferably 1:1 to 2:1 (e.g., 1.5:1).

The mass molar ratio of the pyridine to the compound as shown in formula H can be a conventional mass molar ratio in the art, preferably 0.5:1 to 3:1, more preferably 1:1 to 2:1 (e.g., 1:1).

The temperature of the substitution reaction can be a conventional reaction temperature in the art, preferably 10 to 40° C., more preferably 20 to 30° C.

The progress of the substitution reaction can be monitored by conventional means in the art (e.g., TLC, LC-MS or HPLC, etc.); the time of the substitution reaction is not particularly limited, provided that the content of the compound as shown in formula H in the reaction system no longer changes, and the time of the substitution reaction is preferably 10 to 30 hours, more preferably 15 to 20 hours (e.g., 18 hours).

The post-treatment of the reaction can further comprise the following steps: mixing the reaction solution with water, filtering, washing the solid and drying. The water is preferably added dropwise. The temperature during the mixing is preferably 10 to 40° C. (10 to 20° C.). After the mixing, preferably stirring for 1 to 5 hours. The solvent for the washing is preferably water. The drying is preferably drying under vacuum.

The present disclosure provides a preparation method of the compound as shown in formula D, which comprises the following steps:

(1) preparing the compound as shown in formula F according to any of the above preparation methods;

(2) subjecting the compound as shown in formula F with hydrogen to a reduction reaction as shown below in an organic solvent and in the presence of a catalyst;

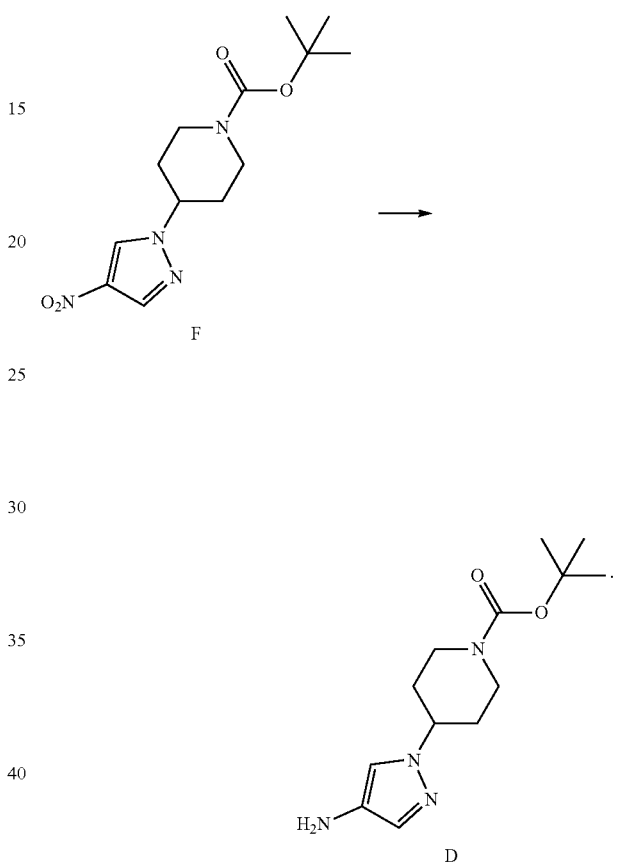

In step (2), the conditions and operations of the reduction reaction are the same as those conventional in the art for such reactions.

The present disclosure provides a preparation method of the compound as shown in formula C, which comprises the following steps:

(1) preparing the compound as shown in formula D according to any of the above preparation methods;

(2) subjecting the compound as shown in formula E with the compound as shown in formula D to a substitution reaction as shown below in an organic solvent and in the presence of a base;

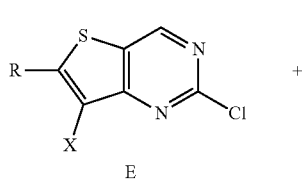

-continued

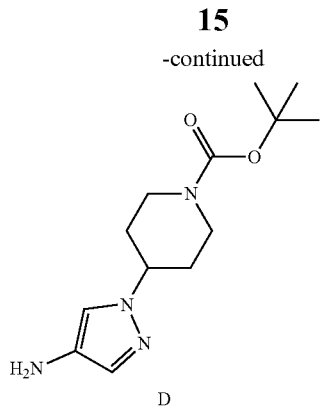

D

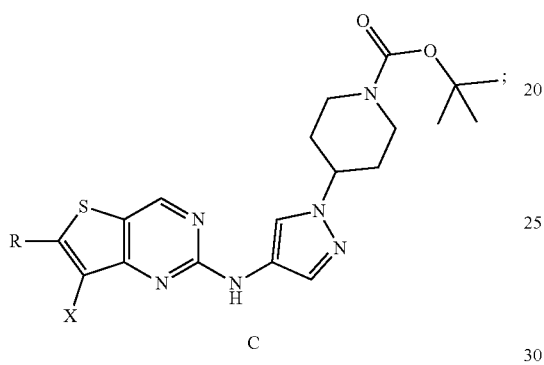

C wherein, X is Br or I, preferably Br;

R is H or $C_1$-$C_3$ alkyl, preferably $C_1$-$C_3$ alkyl, more preferably methyl.

In step (2), the conditions and operations of the substitution reaction are the same as those of the reactions described above.

The present disclosure provides a preparation method of the compound as shown in formula B, which comprises the following steps:

(1) preparing the compound as shown in formula C according to any of the above preparation methods;

(2) subjecting the compound as shown in formula C with the compound as shown in formula K to a coupling reaction as shown below under a protective gas atmosphere, in a solvent and in the presence of a catalyst and a base; the catalyst comprises a palladium compound and a phosphine ligand;

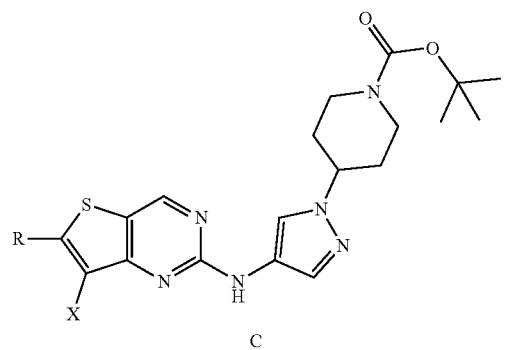

C

+

-continued

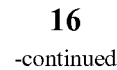

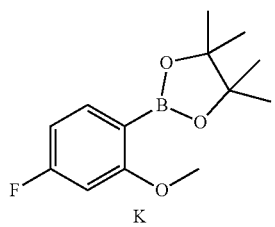

K

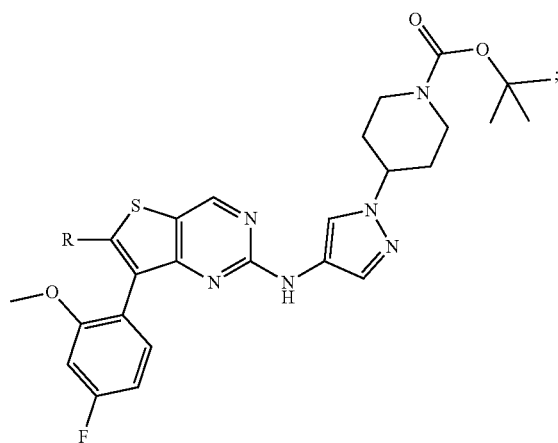

B wherein, X is Br or I, preferably Br;

R is H or $C_1$-$C_3$ alkyl, preferably $C_1$-$C_3$ alkyl, more preferably methyl.

In step (2), the conditions and operations of the coupling reaction are the same as those of such reactions mentioned above.

The present disclosure also provides a preparation method of the compound as shown in formula G, which comprises the following steps: subjecting the compound as shown in formula H with p-toluenesulfonyl chloride to a substitution reaction as shown below in the presence of pyridine;

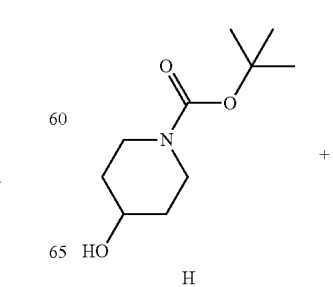

+

H

-continued

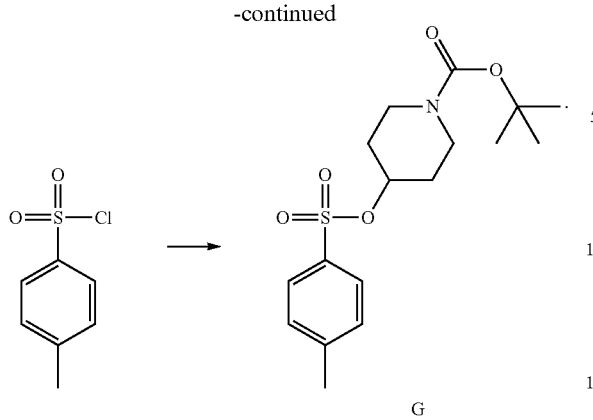

The conditions and operations of the substitution reaction are the same as those of such reactions described above.

On the basis of conforming to common knowledge in the art, the above preferred conditions can be combined arbitrarily to obtain preferred examples of the present disclosure.

The reagents and raw materials used in the present disclosure are all commercially available.

The positive and progressive effect of the present disclosure is that: the present disclosure provides a new synthesis idea, and the preparation method of the present disclosure can improve the yield of products, and reduce the production cost; in addition, the preparation method has simple reaction conditions and a strong process operability, which is beneficial to industrial production and the reduction of the generation of three wastes.

DETAILED DESCRIPTION OF THE EMBODIMENT

The present disclosure will be further described by way of embodiments, but the present disclosure is not limited to the scope of the embodiments. Experimental methods for which specific conditions are not indicated in the following embodiments are selected according to conventional methods and conditions, or according to the product instructions.

Embodiment 1:
2-chloro-6-methylthieno[3,2-d]pyrimidine

To a 500 L reaction kettle, palladium 10% on carbon (4.6 kg), 2,4-dichloro methylthieno[3,2-d]pyrimidine (24.2 kg, 109.5 mol), tetrahydrofuran (150 kg) and N,N-diisopropylethylamine (17.0 kg, 131.5 mol) were successively added. The kettle was filled with hydrogen, and the hydrogen pressure was controlled at 0.5 MPa. Stirring was started and the reaction was kept at a temperature of 25±5° C. and reacted for 120 hours. The mixture was filtered, and the filtrate was collected, and then the filtrate was concentrated under reduced pressure; ethanol (58 kg) was added to the concentrate, and the mixture was concentrated again to bring out the residual tetrahydrofuran. Ethanol (60 kg) was added, and the mixture was stirred at 70±5° C. until the solids were completely dissolved. The temperature was lowered and controlled at 25±5° C. 360 kg of purified water was added dropwise to the kettle, the rate of dropwise addition was controlled and the temperature was maintained at 25±5° C. The solid product was precipitated, centrifuged, and the filter cake was dried under vacuum to obtain 18.94 kg of product 2-chloro-6-methylthieno[3,2-d]pyrimidine with a yield of 93.2%. LC-MS (ESI): m/z=185.1 [M+H]+.

$^1$H NMR (400 MHz, d$_6$-DMSO): δ 9.30 (s, 1H), 7.34 (s, 1H), 2.73 (s, 3H).

Embodiment 2:
2-chloro-6-methylthieno[3,2-d]pyrimidine

To a 100 mL reaction flask, palladium 10% on carbon (0.17 g), 2,4-dichloro-6-methylthieno[3,2-d]pyrimidine (2 g, 9.2 mmol), tetrahydrofuran (40 mL) and N,N-diisopropylethylamine (1.412 g, 10.9 mmol) were successively added. The flask was filled with hydrogen, and the hydrogen pressure was controlled at 0.5 MPa. Stirring was started and the reaction was kept at a temperature of 25±5° C. and reacted for 20 hours. The mixture was filtered, and the filtrate was collected, and then the filtrate was concentrated under reduced pressure; ethanol (2.1 g) was added to the concentrate, and the mixture was concentrated again to bring out the residual tetrahydrofuran. Ethanol (2.2 g) was added, and the mixture was stirred at 70±5° C. until the solids were completely dissolved. The temperature was lowered and controlled at 25±5° C. 13.3 g of purified water was added dropwise to the flask, the rate of dropwise addition was controlled and the temperature was maintained at 25±5° C. The solid product was precipitated, centrifuged, and the filter cake was dried under vacuum to obtain 2.4 g of product 2-chloro-6-methylthieno[3,2-d]pyrimidine with a yield of 82%. The LC-MS and $^1$H NMR were the same as in embodiment 1.

Embodiment 3: 7-bromo-2-chloro-6-methylthieno[3,2-d]pyrimidine

To a 500 L enamel reaction kettle, trifluoroacetic acid (150 kg), 2-chloro-6-methylthieno[3,2-d]pyrimidine (18.90 kg, 102.4 mol) were added. N-Bromosuccinimide (18.33 kg, 103.0 mol) was added and the temperature was controlled at 15±5° C. After the addition was completed, the reaction was kept at a temperature of 25±5° C. for 2 hours. The reaction was monitored by sampling and a small amount of raw material was left. Additional N-bromosuccinimide (1.0 kg, 5.6 mol) was added, and stirring was continued for 1 hour; the reaction was monitored by sampling to show that the reaction was completed. 274 kg of water was added dropwise under a controlled temperature of 10±5° C. After the addition was completed, the mixture was stirred at 10±5° C. for 2 hours. The mixture was centrifuged and the solid was dried under vacuum to obtain 24.68 kg of product 7-bromo-2-chloro-6-methylthieno[3,2-d]pyrimidine with a yield of 91.4%. LC-MS (ESI): m/z=265.0 [M+H]+.

$^1$H NMR (400 MHz, d$_6$-DMSO): δ 9.33 (s, 1H), 2.64 (s, 3H).

Embodiment 4: tert-butyl 4-(p-toluenesulfonyl)piperidine-1-carboxylate (compound G)

To a 500 L enamel reaction kettle, pyridine (176 Kg), N—BOC-4-hydroxypiperidine (36.00 kg, 178.9 mol) were added. p-Toluenesulfonyl chloride (50.5 kg, 264.9 mol) was added in batches at a controlled temperature of 10±10° C. After the addition was completed, the reaction was kept at a temperature of 25±5° C. for 18 hours. The reaction solution was transferred to a 1000 L reactor kettle, and 710 kg of water was added dropwise at a controlled temperature of 15±5° C. After the addition was completed, the mixture was stirred at 15±5° C. for 2 hours. The mixture was filtered, and the solid was washed with water and dried under vacuum to obtain 59.3 kg of product tert-butyl 4-(p-toluenesulfonyl)piperidine-1-carboxylate with a yield of 93.3%. LC-MS (ESI): m/z=378.0 [M+Na]+.

Embodiment 5: tert-butyl 4-(4-nitro-1h-pyrazol-1-yl)piperidine-1-carboxylate (Compound F)

N,N-Dimethylformamide (252 kg), tert-butyl 4-(p-toluenesulfonyl)piperidine-1-carboxylate (59.3 kg, 166.8 mol), 4-nitropyrazole (21.5 kg, 190.1 mol) and anhydrous potassium carbonate (34.3 kg, 248.2 mol) were added to the reaction kettle. The reaction was kept at a temperature of 80±5° C. for 18 hours. The temperature was lowered and controlled at 15±5° C., 900 kg of water was added dropwise, and the rate of dropwise addition was controlled and the temperature was maintained at 15±5° C. After the addition was completed, the mixture was stirred at 5±5° C. for 2 hours. The mixture was filtered, and the solid was washed twice with water and dried under vacuum to obtain 39.92 kg of product tert-butyl 4-(4-nitro-1H-pyrazol-1-yl)piperidine-1-carboxylate with a yield of 80.8%. LC-MS (ESI): m/z=319.1[M+Na]+.
$^1$H NMR (400 MHz, d$_6$-DMSO): δ 8.96 (s, 1H), 8.27 (s, 1H), 4.44-4.51 (m, 1H), 4.06-4.08 (m, 2H), 2.75-2.91 (m, 2H), 2.04-2.07 (m, 2H), 1.80-1.89 (m, 2H), 1.41 (s, 9H).

Embodiment 6: tert-butyl 4-(4-amino-1h-pyrazol-1-yl)piperidine-1-carboxylate (Compound D)

Palladium 10% on carbon (2.00 kg), tert-butyl 4-(4-nitro-1H-pyrazol-1-yl)piperidine-1-carboxylate (39.94 kg, 134.09 mol), anhydrous ethanol (314 kg) and ammonia water (20.0 kg, 134.09 mol) were added to a reaction kettle. The kettle was filled with hydrogen, and the hydrogen pressure was controlled at 0.2 MPa. Stirring was started and the reaction was kept at a temperature of 45±5° C. for 4 hours. The mixture was filtered, and the filtrate was collected, and then the filtrate was concentrated under reduced pressure. Ethyl acetate (40 kg) and n-heptane (142 kg) were added to the concentrate, and the mixture was stirred at 25±5° C. for 1 hour, then cooled to 5±5° C. and stirred for 2 hours. The mixture was filtered, and the solid was dried under vacuum to obtain 31.85 kg of product tert-butyl 4-(4-amino-1H-pyrazol-1-yl)piperidine-1-carboxylate with a yield of 88.6%. LC-MS (ESI): m/z=267.2[M+H]+.
$^1$H NMR (400 MHz, d$_6$-DMSO): δ 7.06 (s, 1H), 6.91 (s, 1H), 4.08-4.15 (m, 1H), 3.98-4.01 (m, 2H), 3.81 (brs, 2H), 2.83-2.87 (m, 2H), 1.88-1.91 (m, 2H), 1.63-1.72 (m, 2H), 1.41 (s, 9H).

Embodiment 7: tert-butyl 4-(4-(7-bromo-6-methylthieno[3,2-d]pyrimidin-2-yl)amino)-1h-pyrazol-1-yl)piperidine-1-carboxylate n-Butanol (117 kg), N,N-diisopropylethylamine (15.00 kg, 116.06 mol), tert-butyl 4-(4-amino-1H-pyrazol-1-yl)piperidine-1-carboxylate (32.02 kg, 120.22 mol) and 7-bromo-2-chloro-6-methylthieno[3,2-d]pyrimidine (24.68 kg, 93.65 mol) were added to a reaction kettle. Stirring was started and the reaction was kept at a temperature of 100±5° C. for 42 hours. The mixture was concentrated under reduced pressure. Methanol was added to the concentrate for slurrying. The mixture was filtered, and the solid was dried under vacuum to obtain 37.26 kg of product tert-butyl 4-(4-(7-bromo-6-methylthieno[3,2-d]pyrimidin-2-yl)amino)-1H-pyrazol-1-yl)piperidine-1-carboxylate with a yield of 80.6%. LC-MS (ESI): m/z=493.1[M+H]+.
$^1$H NMR (400 MHz, d$_6$-DMSO): δ 9.73 (s, 1H), 8.97 (s, 1H), 8.18 (s, 1H), 7.68 (s, 1H), 4.30-4.36 (m, 1H), 4.01-4.04 (m, 2H), 2.87-2.93 (m, 2H), 2.53 (s, 3H), 2.00-2.03 (m, 2H), 1.70-1.80 (m, 2H), 1.41 (s, 9H).

Embodiment 8: tert-butyl 4-(44(7-(4-fluoro-2-methoxyphenyl)-6-methylthieno[3,2-d]pyrimidin-2-yl)amino)-1h-pyrazol-1-yl)piperidine-1-carboxylate Purified water (113 kg), dioxane (390 kg), tert-butyl 4-(4-(7-bromo-6-methylthieno[3,2-d]pyrimidin-2-yl) amino)-1H-pyrazol-1-yl)piperidine-1-carboxylate (37.26 kg, 93.65 mol), 2-methoxy-4-fluorophenylboronic acid pinacol ester (23.05 kg, 120.22 mol), anhydrous potassium carbonate (20.95 kg, 151.8 mol), palladium acetate (0.18 kg, 0.80 mol) and 2-dicyclohexylphosphino-2,4,6-triisopropylbiphenyl (0.90 kg, 1.89 mol) were added to a reaction kettle. The reaction was carried out at a controlled temperature of 70±5° C. for 4 hours under the protection of nitrogen. The temperature was lowered to 40±5° C., and ammonia water (68 kg) was added and the mixture was stirred for 8 hours. The temperature was lowered to 20±5° C., and the mixture was dilute with water (1110 kg). The mixture was extracted twice with dichloromethane (244 kg, 170 kg). The organic phases were combined and washed with water and saturated brine in turn. 3-Mercaptopropylethyl sulfide silica (4.0 kg, used to remove heavy metal palladium) was added the organic phase, and the mixture was stirred at a controlled temperature of 40±5° C. for 20 hours. The mixture was filtered, and the filtrate was concentrated under reduced pressure. The residue was slurried by methyl tert-butyl ether and ethanol in turn. The mixture was filtered, and the solid was dried under vacuum to obtain 34.6 kg of tert-butyl 4-(4-((7-(4-fluoro-2-methoxyphenyl)-6-methylthieno[3,2-d]pyrimidin-2-yl)amino)-1H-pyrazol-1-yl)piperidine-1-carboxylate with a yield of 68.6%. LC-MS (ESI): m/z=539.3 [M+H]+.
$^1$H NMR (400 MHz, d$_6$-DMSO): δ 9.46 (s, 1H), 8.94 (s, 1H), 7.76 (s, 1H), 7.38 (s, 1H), 7.33-7.35 (m, 1H), 7.08-7.11 (m, 1H), 6.91-6.95 (m, 1H), 4.03-4.12 (m, 3H), 3.73 (s, 3H), 2.85-2.89 (m, 2H), 2.39 (s, 3H), 1.90-1.93 (m, 2H), 1.55-1.60 (m, 2H), 1.41 (s, 9H).

Comparative Embodiment 1: 2-chloro-6-methylthieno[3,2-d]pyrimidine (Compound I)

To a 100 mL reaction flask, palladium 10% on carbon (0.1 g), 2,4-dichloro methylthieno[3,2-d]pyrimidine (2 g, 9.2 mmol), methanol (40 mL) and N,N-diisopropylethylamine (1.412 g, 10.9 mmol) were successively added. The flask was filled with hydrogen, and the hydrogen pressure was controlled at 0.5 MPa. Stirring was started and the reaction was kept at a temperature of 25±5° C. for 21 hours. The mixture was filtered, and the filtrate was collected, and then the filtrate was concentrated under reduced pressure; ethanol (2.1 g) was added to the concentrate, and the mixture was concentrated again to bring out the residual methanol. Ethanol (2.2 g) was added, and the mixture was stirred at 70±5° C. until the solids were completely dissolved. The temperature was lowered and controlled at 25±5° C. 13.3 g of purified water was added dropwise to the flask, the rate of dropwise addition was controlled and the temperature was maintained at 25±5° C. The solid product was precipitated, centrifuged, and the filter cake was dried under vacuum to obtain 1.6 g of product 2-chloro-6-methylthieno[3,2-d]pyrimidine with a yield of 54%. The yield of methoxy substituted impurity

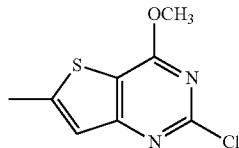

was 20%.

Comparative Embodiment 2: 2-chloro-6-methylthieno[3,2-d]pyrimidine (Compound I)

After replacing the solvent tetrahydrofuran with ethyl acetate in embodiment 2,2-chloro-6-methylthieno[3,2-d]pyrimidine was poorly soluble in ethyl acetate and only a small amount of product was produced, so the specific yield was not calculated.

Comparative Embodiment 3: tert-butyl 4-(p-toluenesulfonyl)piperidine-1-carboxylate (Compound G)

To a 100 mL reaction flask, triethylamine (25 mL), N—BOC-4-hydroxypiperidine (5 g) were added. p-Toluenesulfonyl chloride (7.1 g) was added in batches at a controlled temperature of 10±10° C. After the addition was completed, the reaction was kept at a temperature of 25±5° C. for 25 hours. LC-MS monitoring showed that a large number of raw materials were unreacted and the reaction solution was black-red in color.

The invention claimed is:

1. A preparation method of a compound as shown in formula B, comprising the following steps: subjecting a compound as shown in formula C with a compound as shown in formula K to a coupling reaction as shown below under a protective gas atmosphere, in a solvent and in the presence of a catalyst and a base; the catalyst comprises a palladium compound and a phosphine ligand;

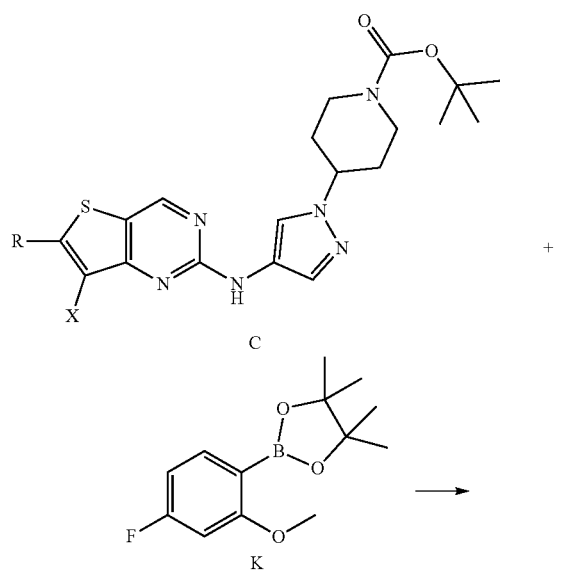

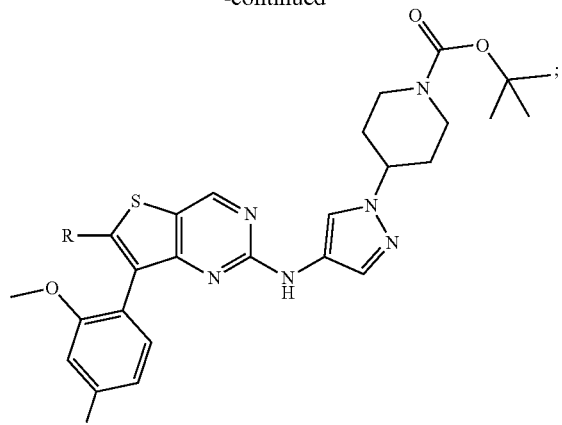

wherein, X is Br or I;
R is H or $C_1$-$C_3$ alkyl.

2. The preparation method of the compound as shown in formula B as claimed in claim 1, wherein,
X is Br;
or, R is $C_1$-$C_3$ alkyl;
or, the solvent is a mixed solvent of water and an organic solvent;
or, the base is an inorganic base;
or, the palladium compound is zero-valent palladium or divalent palladium salt;
or, the phosphine ligand is 2-dicyclohexylphosphino-2,4,6-triisopropylbiphenyl and/or 1,1'-bis(diphenylphosphino) ferrocene;
or, the palladium compound and the phosphine ligand are added in the form of a complex, or, the palladium compound and the phosphine ligand are added in the form of a mixture;
or, the molar concentration of the compound as shown in formula C in the solvent is 0.1 to 0.5 mol/L;
or, the molar ratio of the compound as shown in formula K to the compound as shown in formula C is 1:1 to 3:1;
or, the molar ratio of the base to the compound as shown in formula C is 1:1 to 3:1;
or, the molar ratio of the palladium compound to the compound as shown in formula C is 1:50 to 1:150;
or, the molar ratio of the phosphine ligand to the palladium compound is 1:1 to 5:1;
or, the protective gas is nitrogen and/or argon;
or, the temperature of the coupling reaction is 50 to 100° C.;
or, the time of the coupling reaction is 3 to 7 hours;
or, the post-treatment of the coupling reaction also comprises the following steps: mixing the reaction solution with ammonia water and water, extracting with organic solvent, washing the obtained organic phase, removing the palladium from the organic phase, filtering, concentrating the filtrate, slurrying the concentrate, filtering and drying.

3. The preparation method of the compound as shown in formula B as claimed in claim 2, wherein,
when the solvent is a mixed solvent of water and the organic solvent, the organic solvent is an ether solvent;
when the solvent is a mixed solvent of water and the organic solvent, the volume ratio of the water to the organic solvent is 1:1 to 1:10;

or, R is methyl;

or, the base is an alkali metal carbonate;

or, when the palladium compound is a divalent palladium salt, the divalent palladium salt is PdCl$_2$ and/or Pd(OAc)$_2$;

or, the phosphine ligand is 2-dicyclohexylphosphino-2,4,6-triisopropylbiphenyl;

or, when the palladium compound and the phosphine ligand are added in the form of a complex, the complex is a complex form of zero-valent palladium and a phosphine ligand, and/or, the complex form of a divalent palladium salt and a phosphine ligand;

or, the molar concentration of the compound as shown in formula C in the solvent is 0.1 to 0.3 mol/L;

or, the molar ratio of the compound as shown in formula K to the compound as shown in formula C is 1:1 to 2:1;

or, the molar ratio of the base to the compound as shown in formula C is 1:1 to 2:1;

or, the molar ratio of the palladium compound to the compound as shown in formula C is 1:100 to 1:120;

or, the molar ratio of the phosphine ligand to the palladium compound is 1:1 to 3:1;

or, the temperature of the coupling reaction is 65 to 75° C.;

or, the time of the coupling reaction is 3 to 5 hours;

or, the volume ratio of the ammonia water to the solvent is 1:5 to 1:8;

or, before the ammonia water is mixed with the reaction solution, the temperature is lowered to 30 to 50° C.;

or, after the ammonia water is mixed with the reaction solution, the mixture is stirred for 7 to 10 hours;

or, the volume ratio of the water to the solvent is 1:1 to 4:1;

or, before the water is added, the temperature is lowered to 10 to 30° C.;

or, the organic solvent for extracting is a halogenated hydrocarbon solvent;

or, the washing is washing with water and saturated brine in turn;

or, the reagent used for removing the palladium in the organic phase is 3-mercaptopropylethyl sulfide silica;

or, the slurrying is carried out by slurrying with an ether solvent and an alcohol solvent in turn;

or, the drying is drying under vacuum.

4. The preparation method of the compound as shown in formula B as claimed in claim 1, wherein, which further comprises the following steps: subjecting a compound as shown in formula E with a compound as shown in formula D to a substitution reaction as shown below to obtain the compound as shown in formula C in an organic solvent and in the presence of a base;

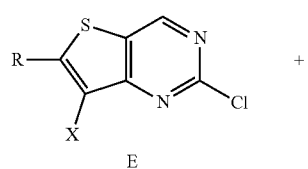

E

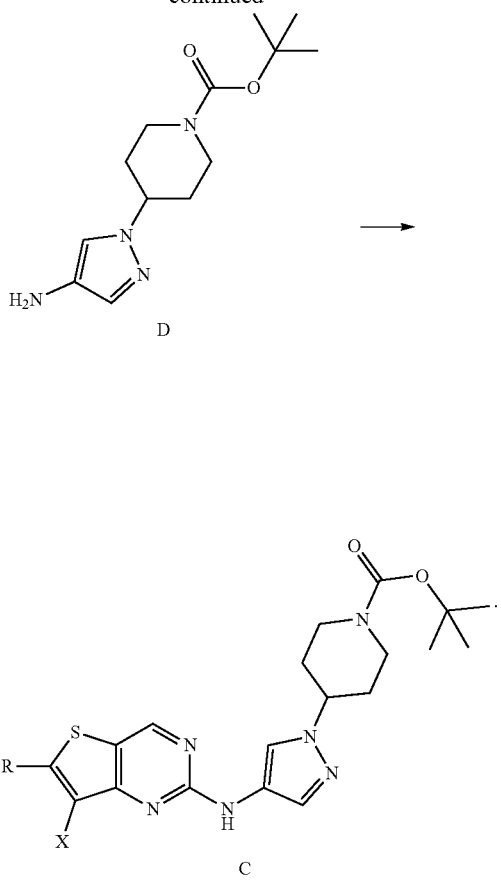

5. The preparation method of the compound as shown in formula B as claimed in claim 4, wherein, the organic solvent is an alcohol solvent;

or, the base is an organic base;

or, the molar concentration of the compound as shown in formula E in the organic solvent is 0.3 to 1.0 mol/L;

or, the molar ratio of the compound as shown in formula D to the compound as shown in formula E is 1:1 to 2:1;

or, the temperature of the substitution reaction is 80° C. to the boiling point temperature of the organic solvent;

or, the time of the substitution reaction is 30 to 60 hours;

or, the post-treatment of the substitution reaction further comprises the following steps: concentrating, slurrying the obtained concentrate, filtering and drying.

6. A preparation method of the compound as shown in formula C, comprising the following steps: subjecting the compound as shown in formula E with the compound as shown in formula D to a substitution reaction as shown below in an organic solvent and in the presence of a base;

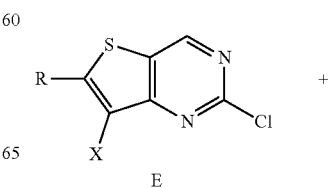

E

25
-continued

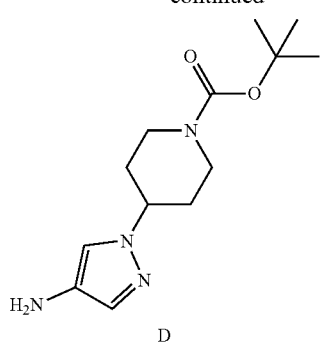

D

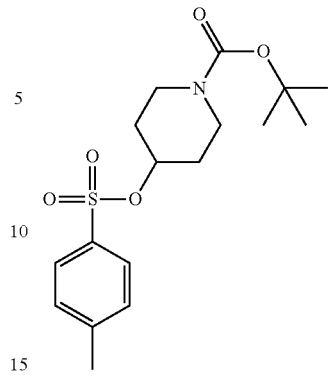

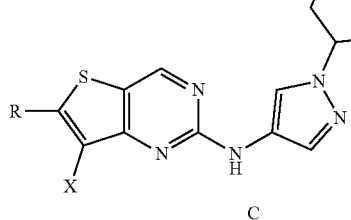

C wherein, X is Br or I;
R is H or C$_1$-C$_3$ alkyl;
the conditions and operations of the substitution reaction are as defined in claim 4.

7. A compound as shown in formula C,

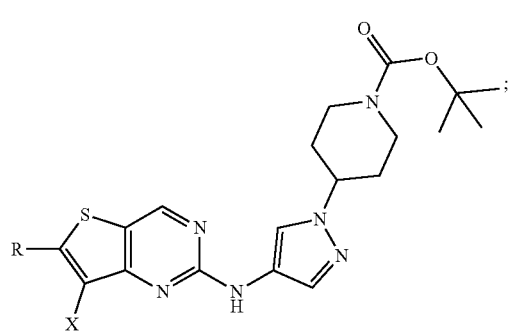

wherein, X and R are as defined in claim 1.

8. A preparation method of a compound as shown in formula F, comprising the following steps: subjecting a compound as shown in formula G with a compound as shown in formula L to a reaction as shown below in an organic solvent and in the presence of a base;

9. The preparation method of the compound as shown in formula B as claimed in claim 3, wherein,
  when the solvent is a mixed solvent of water and the organic solvent, the organic solvent is dioxane;
  when the solvent is a mixed solvent of water and the organic solvent, the volume ratio of the water to the organic solvent is 1:2 to 1:5;
  or, the base is sodium carbonate and/or potassium carbonate;
  or, the complex form of the divalent palladium salt and the phosphine ligand is Pd(dppf)Cl$_2$;
  or, the volume ratio of the ammonia water to the solvent is 1:6.5;
  or, before the ammonia water is mixed with the reaction solution, the temperature is lowered to 40° C.;
  or, after the ammonia water is mixed with the reaction solution, the mixture is stirred for 8 hours;
  or, the volume ratio of the water to the solvent is 2.2:1;
  or, before the water is added, the temperature is lowered to 20° C.;
  or, the organic solvent for extracting is dichloromethane;
  or, the slurrying is carried out by slurrying with methyl tert-butyl ether and ethanol in turn.

10. The preparation method of the compound as shown in formula B as claimed in claim 3, wherein,
  when the solvent is a mixed solvent of water and the organic solvent, the volume ratio of the water to the organic solvent is 1:3.3;
  or, the molar concentration of the compound as shown in formula C in the solvent is 0.19 mol/L;
  or, the molar ratio of the compound as shown in formula K to the compound as shown in formula C is 1.3:1;
  or, the molar ratio of the base to the compound as shown in formula C is 1.6:1;
  or, the molar ratio of the palladium compound to the compound as shown in formula C is 1:117;

or, the molar ratio of the phosphine ligand to the palladium compound is 2.4:1;
or, the temperature of the coupling reaction is 70° C.;
or, the time of the coupling reaction is 4 hours.

11. The preparation method of the compound as shown in formula B as claimed in claim 5, wherein,
the organic solvent is n-butanol;
or, the base is an organic amine;
or, the molar concentration of the compound as shown in formula E in the organic solvent is 0.5 to 0.7 mol/L;
or, the molar ratio of the compound as shown in formula D to the compound as shown in formula E is 1:1 to 1.5:1;
or, the temperature of the substitution reaction is 95 to 105° C.;
or, the time of the substitution reaction is 40 to 50 hours;
or, the concentrating is concentrating under reduced pressure;
or, the solvent used for slurrying is an alcohol solvent;
or, the drying is drying under vacuum.

12. The preparation method of the compound as shown in formula B as claimed in claim 11, wherein, the base is N,N-diisopropylethylamine;
or, the solvent used for slurrying is methanol.

13. The preparation method of the compound as shown in formula F as claimed in claim 8, wherein,
the organic solvent is an amide solvent;
or, the base is an inorganic base;
or, the molar ratio of the compound as shown in formula L to the compound as shown in formula G is 1:1 to 4:1;
or, the molar ratio of the base to the compound as shown in formula G is 1:1 to 5:1;
or, the molar concentration of the compound as shown in formula G in the solvent is 0.3 to 0.9 mol/L;
or, the temperature of the substitution reaction is 50 to 100° C.;
or, the time of the substitution reaction is 10 to 30 hours;
or, post-treatment of the reaction further comprises the following steps: mixing the reaction solution with water, filtering, washing the solid and drying.

14. The preparation method of the compound as shown in formula F as claimed in claim 13, wherein,
the organic solvent is N,N-dimethylformamide;
or, the base is an alkali metal carbonate;
or, the molar ratio of the compound as shown in formula L to the compound as shown in formula G is 1:1 to 2:1;
or, the molar ratio of the base to the compound as shown in formula G is 1:1 to 2:1;
or, the molar concentration of the compound as shown in formula G in the solvent is 0.5 to 0.7 mol/L;
or, the temperature of the reaction is 75 to 85° C.;
or, the time of the reaction is 16 to 20 hours;
or, the water is added;
or, the temperature during the mixing is 10 to 40° C.;
or, after the mixing, the stirring is performed for 1 to 5 hours;
or, the solvent for the washing is water;
or, the drying is drying under vacuum.

15. The preparation method of the compound as shown in formula F as claimed in claim 14, wherein,
the base is potassium carbonate;
or, the molar ratio of the compound as shown in formula L to the compound as shown in formula G is 1.1:1;
or, the molar ratio of the base to the compound as shown in formula G is 1.5:1;
or, the molar concentration of the compound as shown in formula G in the solvent is 0.6 mol/L;
or, the temperature of the reaction is 80° C.;
or, the time of the reaction is 18 hours;
or, the temperature during the mixing is 10 to 20° C.

16. The compound as shown in formula C as claimed in claim 7, wherein,
the compound as shown in formula C is the following structure,

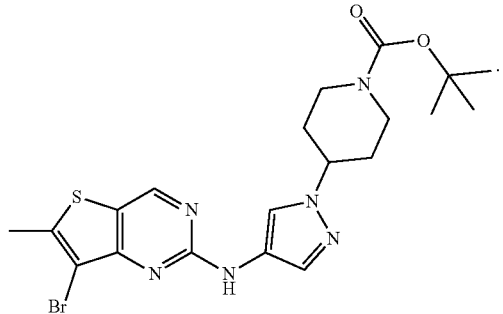 [SMILES: Cc1sc2cnc(Nc3cnn(C4CCN(C(=O)OC(C)(C)C)CC4)c3)nc2c1Br]

* * * * *